(12) United States Patent
Barrios et al.

(10) Patent No.: US 12,260,366 B2
(45) Date of Patent: Mar. 25, 2025

(54) CUSTOM PRINTING OF BULK MAILING

(71) Applicant: Bryan Barrios, New Orleans, LA (US)

(72) Inventors: Bryan Barrios, Thibodaux, LA (US); Clark McClendon, Carriere, MS (US); Caitlin Wrend, Louisville, CO (US)

( * ) Notice: Subject to any disclaimer, the term of this patent is extended or adjusted under 35 U.S.C. 154(b) by 0 days.

(21) Appl. No.: 17/932,270

(22) Filed: Sep. 14, 2022

(65) Prior Publication Data

US 2023/0079845 A1    Mar. 16, 2023

Related U.S. Application Data

(60) Provisional application No. 63/244,703, filed on Sep. 15, 2021.

(51) Int. Cl.
    *G06Q 10/0833*    (2023.01)
    *G07B 17/00*     (2006.01)

(52) U.S. Cl.
    CPC ... *G06Q 10/0833* (2013.01); *G07B 17/00314* (2013.01); *G07B 17/00362* (2013.01); *G07B 17/00024* (2013.01); *G07B 2017/0004* (2013.01); *G07B 17/00193* (2013.01); *G07B 2017/00298* (2013.01); *G07B 2017/00338* (2013.01); *G07B 2017/00354* (2013.01); *G07B 2017/00379* (2013.01); *G07B 17/00435* (2013.01); *G07B 2017/00443* (2013.01); *G07B 2017/00451* (2013.01)

(58) Field of Classification Search
    CPC .......... G06Q 10/0833; G07B 17/00314; G07B 17/00362; G07B 17/00024; G07B 17/00193; G07B 17/00435; G07B 2017/0004; G07B 2017/00298; G07B 2017/00338; G07B 2017/00354; G07B 2017/00379; G07B 2017/00443; G07B 2017/00451
    USPC .......................................... 705/330
    See application file for complete search history.

(56) References Cited

U.S. PATENT DOCUMENTS

| | | |
|---|---|---|
| 7,243,079 B1 | 7/2007 | Manolis et al. |
| 7,640,493 B2 | 12/2009 | Collie et al. |
| 7,813,833 B2 | 10/2010 | McNairy |
| 9,165,411 B2 | 10/2015 | Foth et al. |

(Continued)

OTHER PUBLICATIONS

"Cryptographic Postage Indicia" Published by Springer Nature Link (Year: 2004).*

*Primary Examiner* — Zeina Elchanti
(74) *Attorney, Agent, or Firm* — Kowert, Hood, Munyon, Rankin & Goetzel, P.C.; Luke S. Langsjoen

(57) ABSTRACT

Methods, computer systems, and memory media for preparing instructions for printing a plurality of postage items. A graphical user interface (GUI) receives first user input. Responsive to the user input, an addressee data file is uploaded, features are extracted from a plurality of columns of the addressee data file, and the plurality of columns are associated with respective address field types based on the extracted features. The GUI displays an indication of the association between columns and address field types. User input may modify or correct the association. Responsive to second user input, instructions are prepared for printing entries from the columns of the addressee data file on respective postage items of the plurality of postage items as respective address fields, and the instructions are stored in a non-transitory computer-readable memory medium.

18 Claims, 19 Drawing Sheets

(56) References Cited

U.S. PATENT DOCUMENTS

| | | | |
|---|---|---|---|
| 2012/0089562 A1* | 4/2012 | Deremigio | G06F 16/254 707/703 |
| 2014/0164076 A1* | 6/2014 | Marcos | G06Q 30/0641 705/26.8 |
| 2017/0308557 A1* | 10/2017 | Cassidy | G06N 20/00 |

* cited by examiner

FIG. 3

FIG. 6

*What are we sending?*
Letter

*Bob's Law Firm*

*When are we sending?*
Date

*How are we sending?*
Delivery

Addresses
*Drag and drop each address component to the column(s) with its matching merge data.*

Jane Doe
Name 2*
123 Elm St
Suite 8
New Orleans, Louisiana 12345

| Column Name 1ˣ | Column Address 1ˣ | Column Address 2ˣ | Column City ˣ | Column State ˣ | Column Zip ˣ |
|---|---|---|---|---|---|
| Jane Day | 123 Elm St | Suite 8 | New Orleans | Mississippi | 98765 |
| Jon Nite | 567 Oak Ln | Apt 10 | Wynnville | Loisiana | 32109 |
| Steve Simms | 901 Lazy Day Rd | | Oberheim | Vermont | 65432 |
| Joe Wright | 345 Green Leaf Ln | Apt 210 | Smithland | Montana | 12345 |
| Louis Lane | 789 Oak Run Dr | | Bobsville | Washington | 78910 |
| James King | 234 Hamilton Rd | | Wurlitzon | North Dakota | 23456 |

*Optional

*FIG. 7*

| 759 Records 802 | | | | | |
|---|---|---|---|---|---|
| Column NAMES | Column ○ ADDRESS | Column ADDRESS 2 | Column CITY | Column STATE | Column ZIP |
| Jane Day | 123 Elm St | Suite 8 | New Orleans | Mississippi | 98765 |
| Jon Nite | 567 Oak Ln | Apt 10 | Wynnville | Loisiana | 32109 |
| Steve Simms | 901 Lazy Day Rd | | Oberheim | Vermont | 65432 |
| Jane Day | 123 Elm St | Suite 8 | New Orleans | Mississippi | 98765 |
| Jon Nite | 567 Oak Ln | Apt 10 | Wynnville | Loisiana | 32109 |
| Steve Simms | 901 Lazy Day Rd | | Oberheim | Vermont | 65432 |
| Jane Day | 123 Elm St | Suite 8 | New Orleans | Mississippi | 98765 |
| Jon Nite | 567 Oak Ln | Apt 10 | Wynnville | Loisiana | 32109 |
| Steve Simms | 901 Lazy Day Rd | | Oberheim | Vermont | 65432 |
| Jane Day | 123 Elm St | Suite 8 | New Orleans | Mississippi | 98765 |
| Jon Nite | 567 Oak Ln | Apt 10 | Wynnville | Loisiana | 32109 |
| Steve Simms | 901 Lazy Day Rd | | Oberheim | Vermont | 65432 |
| Jane Day | 123 Elm St | Suite 8 | New Orleans | Mississippi | 98765 |
| Jon Nite | 567 Oak Ln | Apt 10 | Wynnville | Loisiana | 32109 |
| Steve Simms | 901 Lazy Day Rd | | Oberheim | Vermont | 65432 |
| Jane Day | 123 Elm St | Suite 8 | New Orleans | Mississippi | 98765 |
| Jon Nite | 567 Oak Ln | Apt 10 | Wynnville | Loisiana | 32109 |
| Steve Simms | 901 Lazy Day Rd | | Oberheim | Vermont | 65432 |

⊘ Header Row*  *Unique ID ○  *Optional

FIG. 8

Merge
Highlight variable content and drag to column to merge.

Lorem ipsum dolor
Sit amet, viverra
Lorem ipsum dolor

Dear Sherry Miller,

Lorem ipsum dolor sit amet, consectetur adipiscing elit, sed do eiusmod tempor incididunt ut labore et dolore magna. Ultricies tristique nulla aliquent enim Tortor at. Tempus iaculis urna id volutpat lacus iaoreet. Nulla porttitor massa id neque aliquam vestibulum morbi blandit.

Nunc non blandit massa enim nec. Enim sit amet venenatis urna cursus eget nunc scelerisque viverra, enim tort at. Tempus iaculis urna id volutpat lacus laoreet. Nulla porttitor Tempus iaculis urna id volutpat lacus laoreet. Nulla porttitor Tempus iaculis urna id volutpat lacus laoreet. Nulla porttitor on nisi est sit amet facilisis magna etiam. Nunc non blandit massa enim nec. Enim sit amet venenatis urna cursus eget nunc scelerisque viverra. At New Orleans urna duis cdictum at tempor commodo ullamcorper a lacus. Iaculis urna ullamcorper
Iaculis u

| Column Name | Column Address | Column Address 2 | Column City | Column State | Column Zip |
|---|---|---|---|---|---|
| Jane Day | 123 Elm St | Suite 8 | New Orleans | Mississippi | 98765 |
| Jon Nite | 567 Oak Ln | Apt 10 | Wynnville | Loisiana | 32109 |
| Steve Simms | 901 Lazy Day Rd | | Oberheim | Vermont | 65432 |
| Joe Wright | 345 Green Leaf Ln | Apt 210 | Smithland | Montana | 12345 |
| Louis Lane | 789 Oak Run Dr | | Bobsville | Washington | 78910 |
| James King | 234 Hamilton Rd | | Wurlitzon | North Dakota | 23456 |

$6,831

759 pieces

FIG. 11

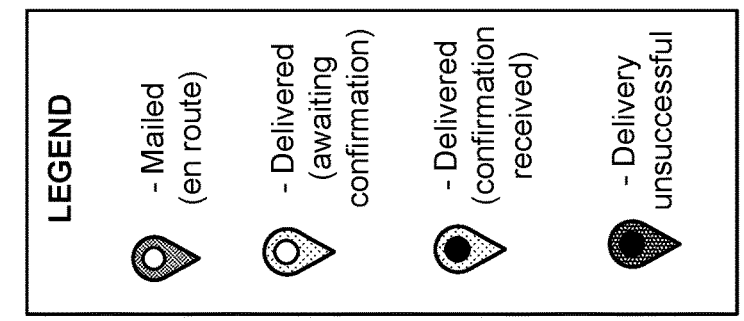
FIG. 14

CUSTOM PRINTING OF BULK MAILING

PRIORITY INFORMATION

This application claims benefit of priority to U.S. Provisional Application No. 63/244,703, titled "Custom Printing of Bulk Mailing" and filed Sep. 15, 2021, which is hereby incorporated by reference in its entirety as though fully and completely set forth herein.

FIELD

The present application generally relates to methods and systems for automatically producing and tracking custom mass mailings.

DESCRIPTION OF THE RELATED ART

Many companies and governments send out bulk mailings to large numbers of recipients for various business, legal, and administrative purposes. The process of preparing and sending bulk mailings may be complicated by the need to customize the content, delivery mechanism, and/or tracking procedures for the mailing materials for different recipients. Sending out bulk mailings to large numbers of recipients with United States Postal Service (USPS) Certified Mail and/or Return Receipt Requests is commonly used by local governments and political subdivisions prior to tax sale or property auction prescribed by law for the recovery of delinquent property tax. The process of preparing and sending bulk mailings to a large number of recipients typically takes a large amount of secretarial time and effort. Accordingly, improvements in the field are desirable.

SUMMARY

Embodiments relate to systems and methods for preparing printing instructions for printing and tracking a plurality of postage items. The system includes a processor coupled to a non-transitory computer-readable memory medium. The system may include, or may be coupled to, a printer that is configured to receive the printing instructions and print the plurality of postage items according to the instructions. The processor may execute program instructions stored on the memory medium to create the printing instructions.

In some embodiments, a graphical user interface (GUI) is displayed on a display. Responsive to first user input, a prompt is displayed that is selectable to upload an addressee data file.

In some embodiments, after uploading the addressee data file, features are automatically extracted from a plurality of columns of the addressee data file, and the plurality of columns are associated with respective address field types based on the extracted features using an adaptive machine learning algorithm.

In some embodiments, the GUI displays an indication of the association between columns and address field types, and user input may modify or correct the association between columns of the addressee data file and address field types.

In some embodiments, responsive to second user input, instructions are prepared for printing entries from the columns of the addressee data file on respective postage items of the plurality of postage items as respective address fields, and the instructions are stored in a non-transitory computer-readable memory medium and/or transmitted to a printing service for printing the plurality of postage items.

In some embodiments, the postage items are mailed and dynamically tracked and displayed on the GUI. A user may interface with the GUI to resend or redirect unsuccessfully delivered postage items.

The techniques described herein may be implemented in and/or used with a number of different types of computing devices, including but not limited to desktop computers, laptops, cellular phones, tablet computers, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 3 is an example of a graphical user interface (GUI) displaying a prompt to enter a Send name, according to some embodiments;

FIG. 6 is an example GUI displaying a plurality of address field types and a subset of an addressee data file, according to some embodiments;

FIG. 7 is an example GUI displaying a plurality of address field types and associated data of an addressee data file, according to some embodiments;

FIG. 8 is an example GUI displaying an addressee data file where rows may be omitted from the printing instructions, according to some embodiments;

FIG. 11 is an example GUI displaying a letter template with customized variable content, according to some embodiments.

FIG. 14 is an example GUI displaying a tracking map for delivered postage items awaiting confirmation, according to some embodiments;

Figure 1:
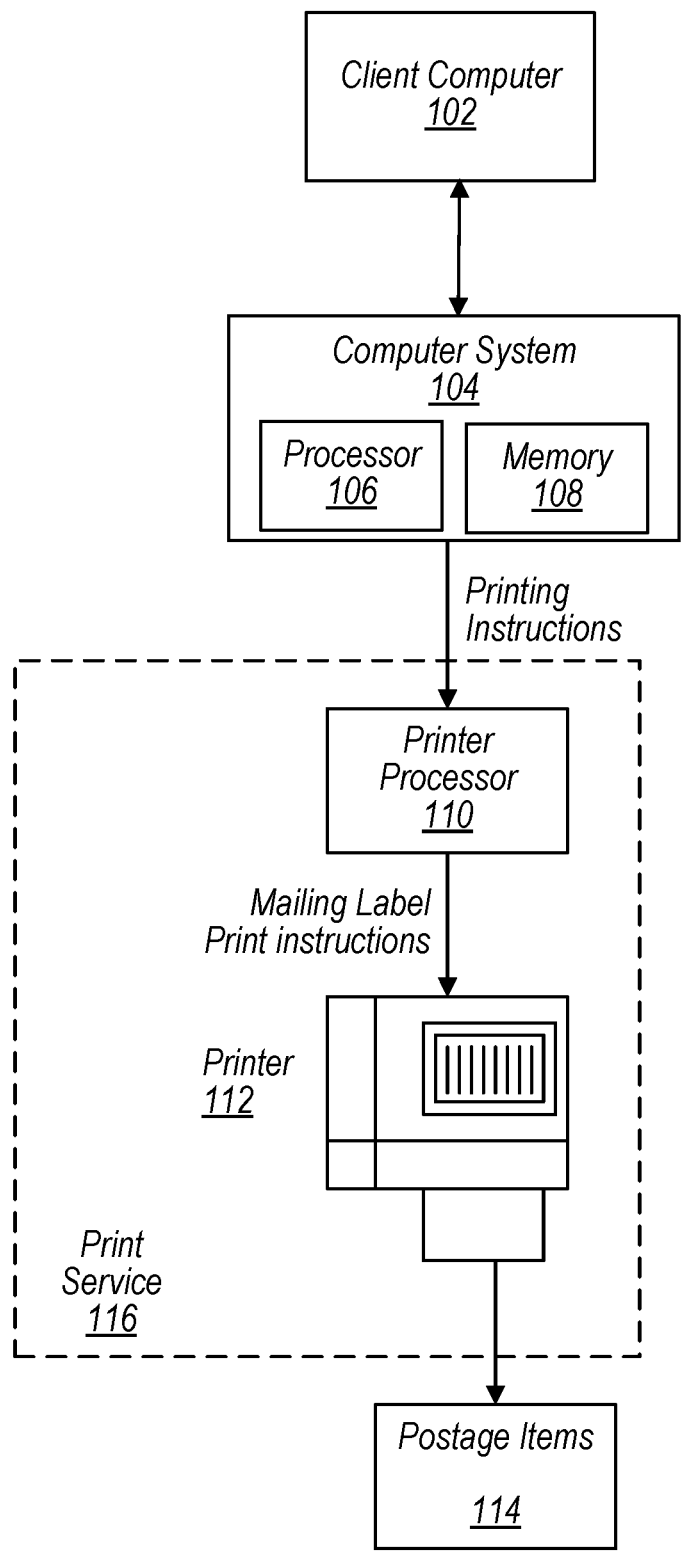
FIG. 1 illustrates a schematic diagram of a system for printing bulk mailings of a plurality of postage items, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Processing Element—refers to various elements or combinations of elements that are capable of performing a function in a device, such as a user equipment or a cellular network device. Processing elements may include, for example: processors and associated memory and circuitry, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system may update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Automatic Bulk Mailings

Companies, corporations, universities, government entities, and other types of organizations often send large quantities of related mail to a plurality of recipients. As one example, for a tax lien or tax deed sale, certified mail may need to be sent to each of a large number of owners, co-owners, and/or other interested parties to the relevant property. Alternatively, a company may desire to send a particular mailing out to each of its employees, customers, or other types of individuals. A university may periodically send bulk mailings out to its faculty, staff, students, donors, or alumni, among other possible types of recipients. More broadly, any of a number of different types of organizations or individuals routinely send bulk mailings out to large numbers of recipients (e.g., potentially hundreds or even thousands of recipients at a time). Typically, formatting, printing, processing, mailing and tracking customized bulk mailings takes a large quantity of secretarial time and effort, increasing costs for the organization or individual. To address these and other concerns, embodiments herein present systems and methods for constructing a streamlined graphical user interface that allows a client to prepare and mail large quantities of custom bulk mailings quickly and easily.

A variety of types of individuals and organizations may utilize embodiments described herein to print customized bulk mailings. For simplicity, the entity that utilizes the described systems and methods to produce (i.e., produce printing instructions for) the customized bulk mailings will be referred to herein as the "client", and the recipients of the customized bulk mailings will be referred to herein as "recipients" or "addressees." Previous methodologies for producing custom bulk mailings may utilize significant time and expense, for a variety of reasons. For example, a client may have a list of addressees in a data file that is not in a standardized form, and a secretary or other individual may typically analyze the data file to determine which fields in the data file to print as specific components of each recipient's address. Further, the client may desire to customize the postage item for different recipients (e.g., a custom letter may be desired with different salutations and/or text for different recipients), which may typically involve a manual process of editing the postage item for each recipient. As another example, some types of mailings utilize tracking and/or delivery confirmation, which may be cumbersome to perform for a large number of mailings. Additionally, it may be desirable to redirect and resend undelivered and returned mail, either automatically or manually, to satisfy certain legal requirements. Embodiments herein address these and other concerns by presenting a streamlined graphical user interface that is useable for creating an arbitrarily large number of customized postage items rapidly, intuitively, and with a dramatically reduced level of effort by the client relative to previous implementations.

FIG. 1—System for Printing Bulk Mailings

FIG. 1 depicts a schematic diagram of a system for printing bulk mailings of a plurality of postage items. In some embodiments, a computer system 104 may receive one or more files from a client (e.g., from a client's computer system 102), such as an addressee data file of the names and addresses of recipients of the bulk mailings, and/or a letter to send with the bulk mailings, among other possibilities. The computer system 104 may further receive user input from the client to facilitate preparation of printing instructions for printing the plurality of postage items 114. The computer system 104 may send the printing instructions to a printer processor 110 of a printing service 116 to queue the plurality of postage items for printing by a printer 112. The printing service 116 may be a commercial printing service, or an in-house printing service operated by the owner of the computer system. The printer 112 then prints a respective address on each postage item, generates and prints tracking barcodes and postage on the postage items, and/or prints custom letters for each of the postage items 114. The printing service may be further configured to automatically fold the letters, insert them into their respective envelopes, seal the envelopes, (optionally) glue a green card to the envelopes (e.g., if the mail is being sent via certified mail), and/or capture an image of the final envelope for record-keeping. The plurality of postage items may be then sent to a postal service such as the United States Postal Service (USPS), FedEx™, or the United Parcel Service™ (UPS™), among other possibilities.

Figure 2:
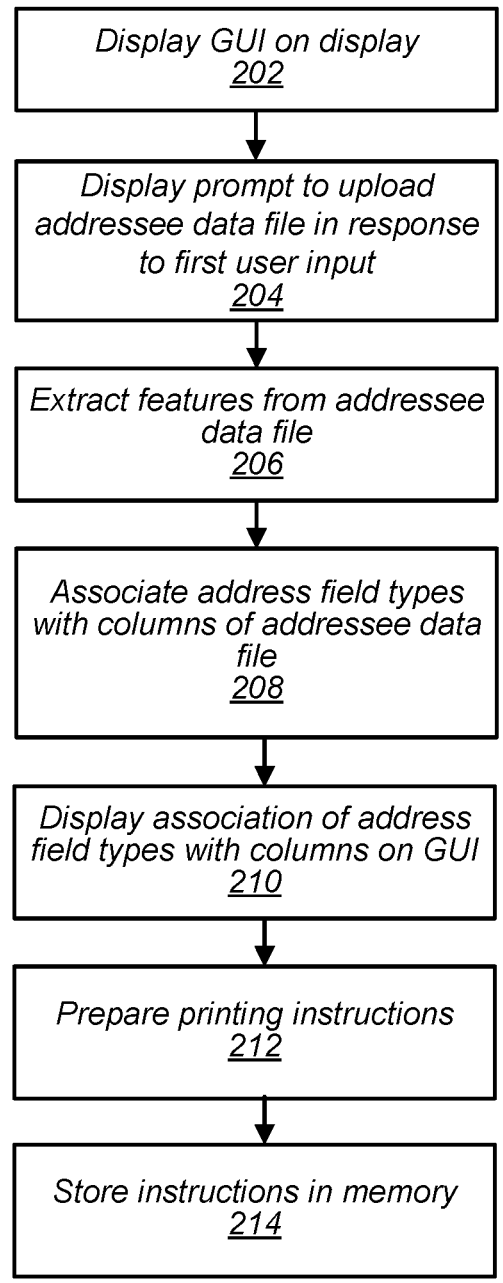
FIG. 2 is a flowchart diagram illustrating a method for preparing instructions for printing a plurality of postage items, according to some embodiments.

FIG. 2—Flowchart for Preparing Printing Instructions

FIG. 2 is a flowchart diagram illustrating a method for preparing instructions for printing a plurality of postage items, according to some embodiments. In some embodiments, a non-transitory, computer-readable memory medium stores program instructions which, when executed by a processor of a computer system, cause a graphical user interface (GUI) to be displayed on a display, receives and responds to user input via the GUI, and performs backend processing for performing the method steps described in reference to FIG. 2. In exemplary embodiments, the GUI is displayed through a webpage that is accessible by a client on their own personal computer system or other type of electronic device. For example, in some embodiments, a client may access a web page using a desktop computer, laptop, tablet, or user equipment (UE) device (e.g., a smart phone), among other possibilities, and the web page may display an interactive GUI useable for producing printing instructions, causing the printing and mailing of postage items, and dynamically tracking the postage items, as described herein.

Figure 4:
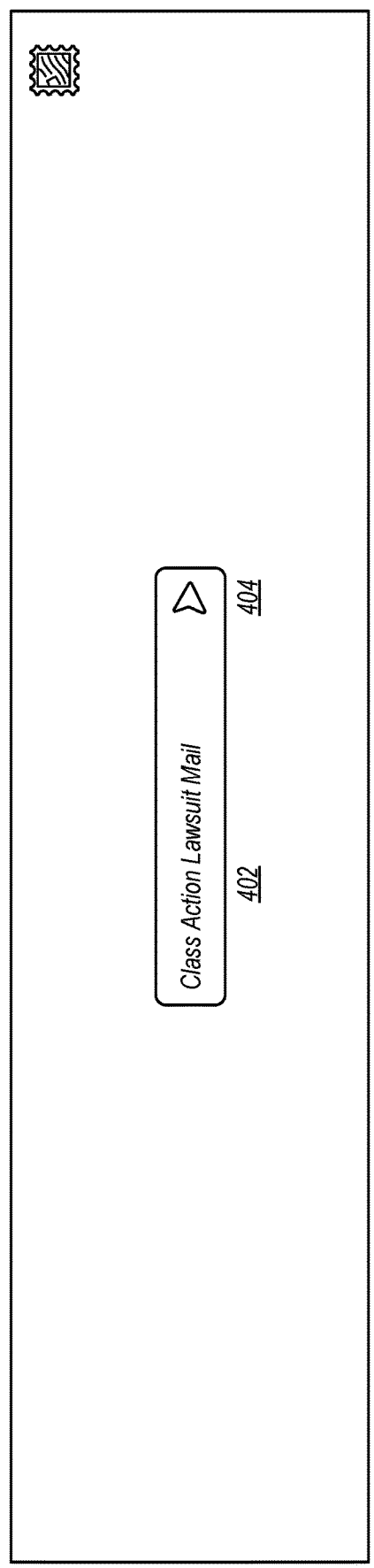
FIG. 4 is an example GUI displaying a Send name, according to some embodiments.

In some embodiments, as shown in FIG. 3, the GUI may present a schematic representation of an envelope with a prompt for the client to enter a "Send" name, where a Send refers to a particular campaign for printing postage items. As shown in FIG. 4, after a client enters a Send name (e.g., "Class Action Lawsuit Mail"), the Send name 402 may be displayed and an arrow 404 may be presented which is selectable to initiate working on the campaign. In some embodiments, the computer system executing the program instructions may be a server computer that sends instructions over the internet to display the GUI on the client's device, and the computer system may receive data (e.g., uploaded addressee data files, letter templates, etc.) and user input over the internet from the client's device to facilitate preparation of the printing instructions. Alternatively, in some embodiments the program instructions may be installable as an executable program on a personal computing device of the client. Once installed on the client's device, the program instructions may be executable to display the interactive GUI on the display of the client's device, receive user input to facilitate production of the printing instructions, and transmit the instructions over the internet or other transmission path to a printing service. In various embodiments, some of the elements of the scheme shown may be performed concurrently, in a different order than shown, or may be omitted. Additional and/or alternative elements may also be performed as desired. As illustrated, the method of FIG. 2 may operate as follows.

At 202, a GUI is displayed on a display. An example GUI is displayed in FIG. 5, which includes a plurality of selectable fields to upload and/or customize different elements of the postage item printing instructions. In some embodiments, the GUI may represent a graphical representation of an envelope, with selectable fields to upload or customize different elements of the postage item, such as recipient address, sender address, send date, delivery method, and/or the postage item to be sent within the envelope, among other possibilities. For example, the GUI may include at least a first icon that is selectable to upload recipient addresses.

Figure 6:
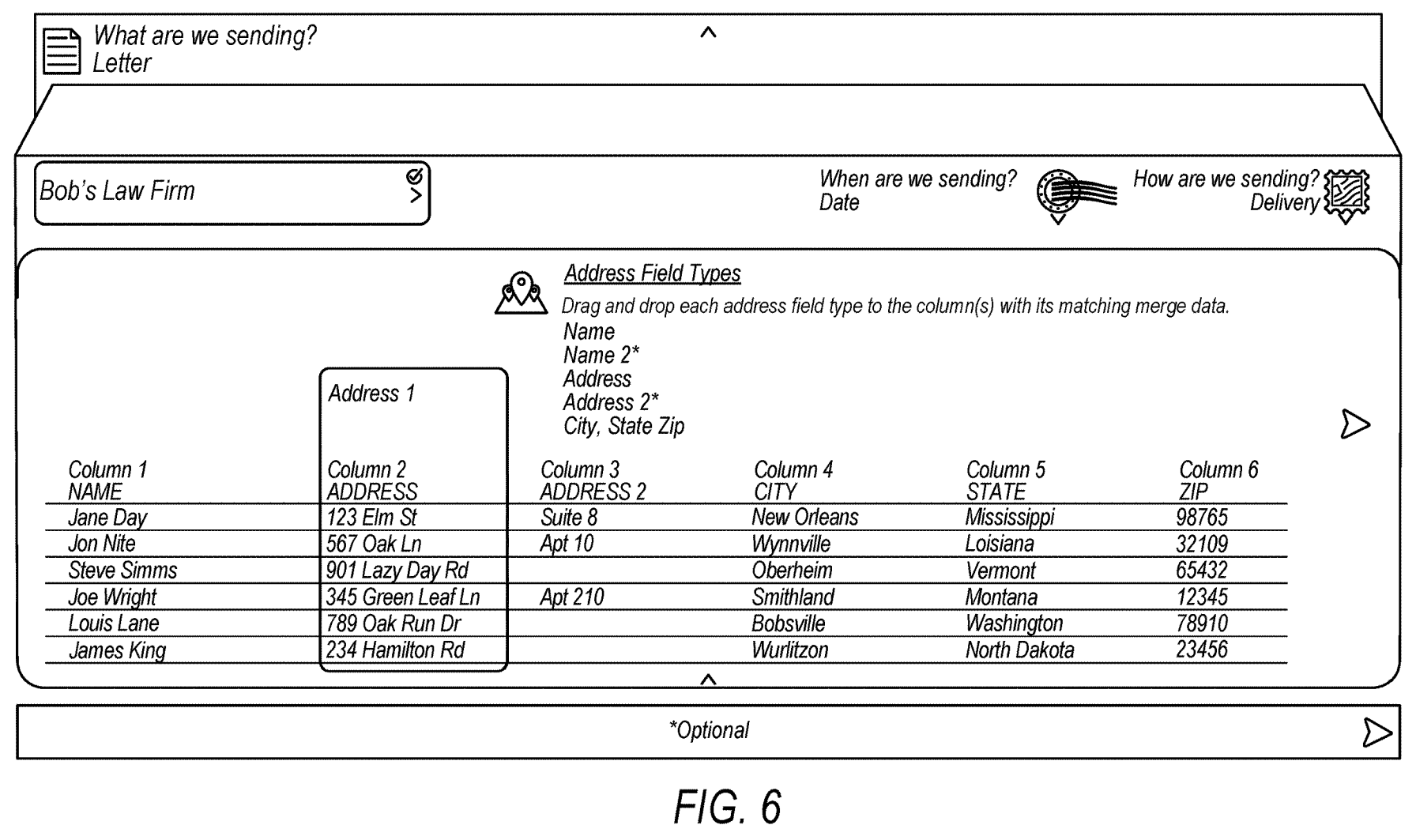

At 204, after receiving user input selecting the first icon, a prompt is displayed that is selectable to upload an addressee data file. The addressee data file may include a plurality of rows and a plurality of columns, where each row corresponds to a different recipient (i.e., addressee) and each column corresponds to a different aspect of the recipients. For example, as illustrated in FIG. 6, there may be a column for each of a plurality of different address field types, such as first name, last name, address, address 2, city, state, and zip code of each recipient. More generally, the addressee data file may include any of a variety of types of information related to the recipients. For example, there may be a column corresponding to a numerical quantity for each addressee, such as their birthdays, money owed, stocks owned, or information related to a property or tax sale, among various other possibilities.

In some embodiments, the addressee data file may be unstructured or otherwise not in a standard format, wherein subsequent processing (e.g., file flattening) may be utilized to restructure the data file so that each row corresponds to a unique addressee and contains entries in respective columns for all information related to the respective addressee.

Alternatively, in some embodiments, the recipients may each correspond to a different column, and the rows may denote the different aspects of each recipient. In these embodiments, it is understood that the methods described herein may be adapted such that instances of "row" are replaced by "column," and vice versa.

At 206, at least in part in response to successfully uploading the addressee data file, feature extraction is performed to extract features from a plurality of columns of the data file. The extracted features may identify characteristics of entries in a column of the data file to assist in associating the column with a particular address field type (or tax sale quantity, or any other relevant string category relevant for printing and mailing a postage item). In some embodiments, the extracted features include a determination of whether entries in respective columns of the plurality of columns include a string of numbers, a string of entirely numbers, a string of non-numerical elements, a string including special characters, a string containing the word "city," or a string including a number within 1900 and the current year. Additionally or alternatively, the extracted features may include, for entries in respective columns of the plurality of columns, one or more of a number of words, a number of letter characters, a number of numerical characters, a number of numbers, a numerical value, a number of special characters, a number of digits of a last number of the entries, a number of characters of a last word of the entries, or a number of decimal digits of the entries. In some embodiments, a feature may be extracted from a column only when a majority of entries in the column, another threshold number of entries in the column, or all the entries in the column share a common feature value. For example, if all entries in a column contain two letters, the feature "two letters" may be extracted and subsequently used to determine that the column corresponds to a "US state" address field type.

In some embodiments, the columns before and/or after a given column will be analyzed in conjunction with the given column to facilitate feature extraction. For example, it may be determined that a column with entries containing either 5 or 9 numerical digits is followed by a column with entries containing two letters. This combined feature "5 or 9 numerical digit column followed by 2 letter column" may be extracted and subsequently used to map these columns to zip code and US state, respectively. Said another way, the extracted features may describe compound features related to multiple adjacent columns.

In some embodiments, rather than performing feature extraction on the entire data file, a file splitter procedure may be performed (as described in further detail below) whereby a user-selectable threshold number of rows are extracted from the addressee data file prior to performing feature extraction, and feature extraction is only performed on the extracted rows. For example, the addressee data file may contain rows corresponding to a large number (e.g., thousands or more) of addressees, and it may be time-consuming to perform feature extraction for all the rows. A user may select a threshold (e.g., 30 or 100 rows), where the feature extraction and subsequent address field type association is performed only for the threshold number of rows. The user may then verify whether the address field type association was accurate before instructing the system to perform the procedure on the remaining rows of the addressee data file.

In some embodiments, prior to extracting respective features from the plurality of columns, a file flattening procedure is performed. to restructure the addressee data file for more effective and efficient processing. In some cases, the uploaded addressee data file may have a format that is not structured in a way that is compatible with the feature extraction and address field type association processes. For example, the data file may be unstructured, or may have title and/or header rows that are not associated with a particular addressee. As another possibility, each addressee may have entries associated with the respective addressee that are contained on multiple rows, and the file flattening process may consolidate all of the entries associated with a particular addressee into a single row. In other words, each row of the restructured addressee data file may include all entries associated with a single respective addressee, and this restructured data file may be better suited for subsequent processing and analysis.

At 208, a plurality of columns of the addressee data file are associated with respective address field types based at least in part on the extracted features of the columns. In some embodiments, associating the plurality of columns of the addressee data file with respective address field types based at least in part on the respective extracted features includes implementing a machine learning algorithm to identify the respective address field types based on the respective extracted features.

For example, columns with entries that contain 5 or 9 numerical digit strings may be identified as zip codes. Columns with entries containing a numerical string followed by a non-numerical string may be identified as an "Address 1" field type, etc.

In some embodiments, the machine learning algorithm may implement logic to disambiguate addresses in the case where addressees have associated with them more than one address. For example, it may be the case for some uploaded data files (e.g., for a tax sale or property sale), that the row associated with a particular addressee includes both the address of the addressee and an address associated with the tax sale or property sale. In this case, it may be desirable to disambiguate the two addresses so that the address of the addressee is printed on the postage item. To accomplish this, it is noted that the addresses of the addressee will vary between addressees, wherein the address associated with the tax sale or property sale may be duplicated for each addressee (since the mass mailing of postage items are all associated with a single tax sale or property sale). Accordingly, the columns containing the addressee address will have unique (non-repeating) addresses for different addressees (i.e., in different rows), whereas the tax sale or property sale address may be the same for different addressees (e.g., because a notification of a single property sale is being mailed out to a plurality of addressees so that the address associated with the property sale is indicated for each of the addressees in the data file).

In these embodiments, the processor may implement instructions to determine that the addressee data file contains two addresses associated with each addressee. It may be further determined that a first address of the two addresses associated with each addressee is duplicated between addressees of the addressee data file and a second address of the two addresses associated with each addressee is not duplicated between the addressees of the addressee data file. In this case, the entries associated with the second address may be selected to be printed as the destination address on the plurality of postage items.

In some embodiments, the method further provides a method to omit particular rows of the addressee data file from the printing instructions. For example, as illustrated in FIG. 8, the GUI may display at least a portion of the addressee data file and allow the client to select one or more rows of the addressee data file (e.g., such as the header row 802) to omit from the printing instructions. The GUI may be configured to receive third user input selecting one or more rows of the addressee data file, and at least in part in response to receiving the third user input, entries in the one or more selected rows may be omitted from the printing instructions.

Figure 5:
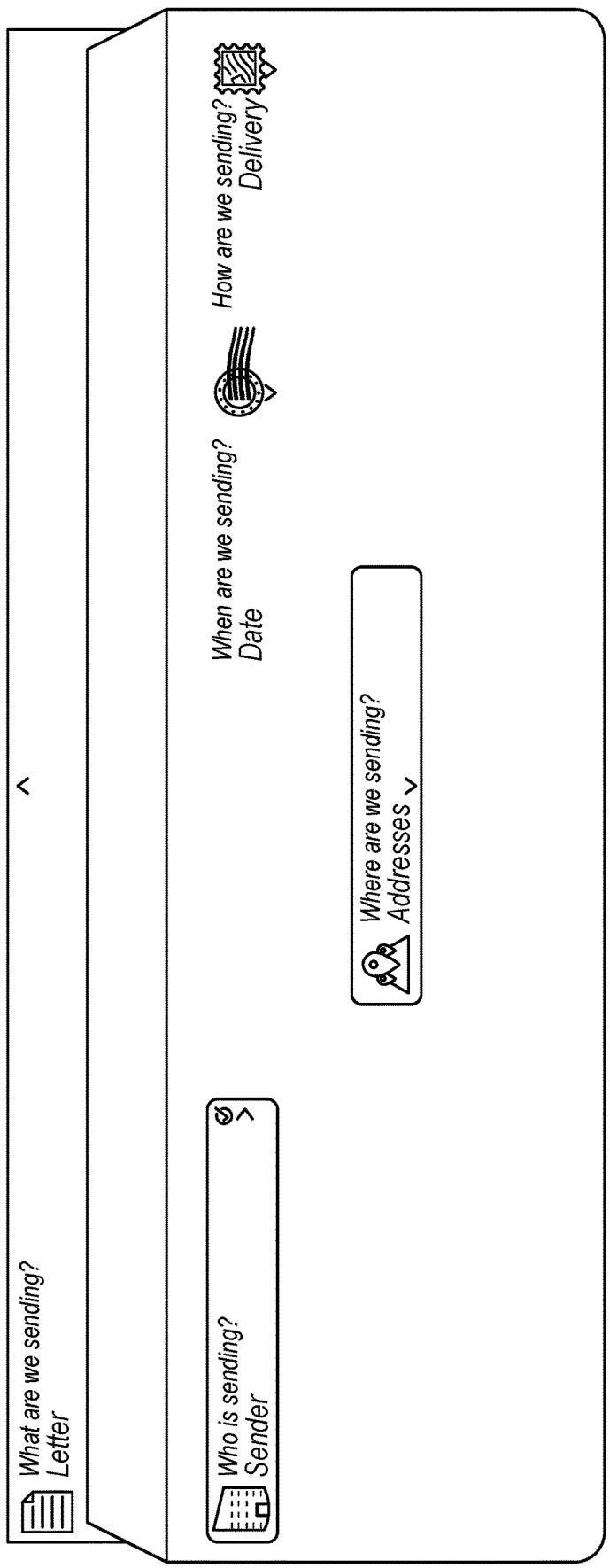
FIG. 5 is an example GUI displaying customizable elements of a postage item, according to some embodiments.
Figure 9:
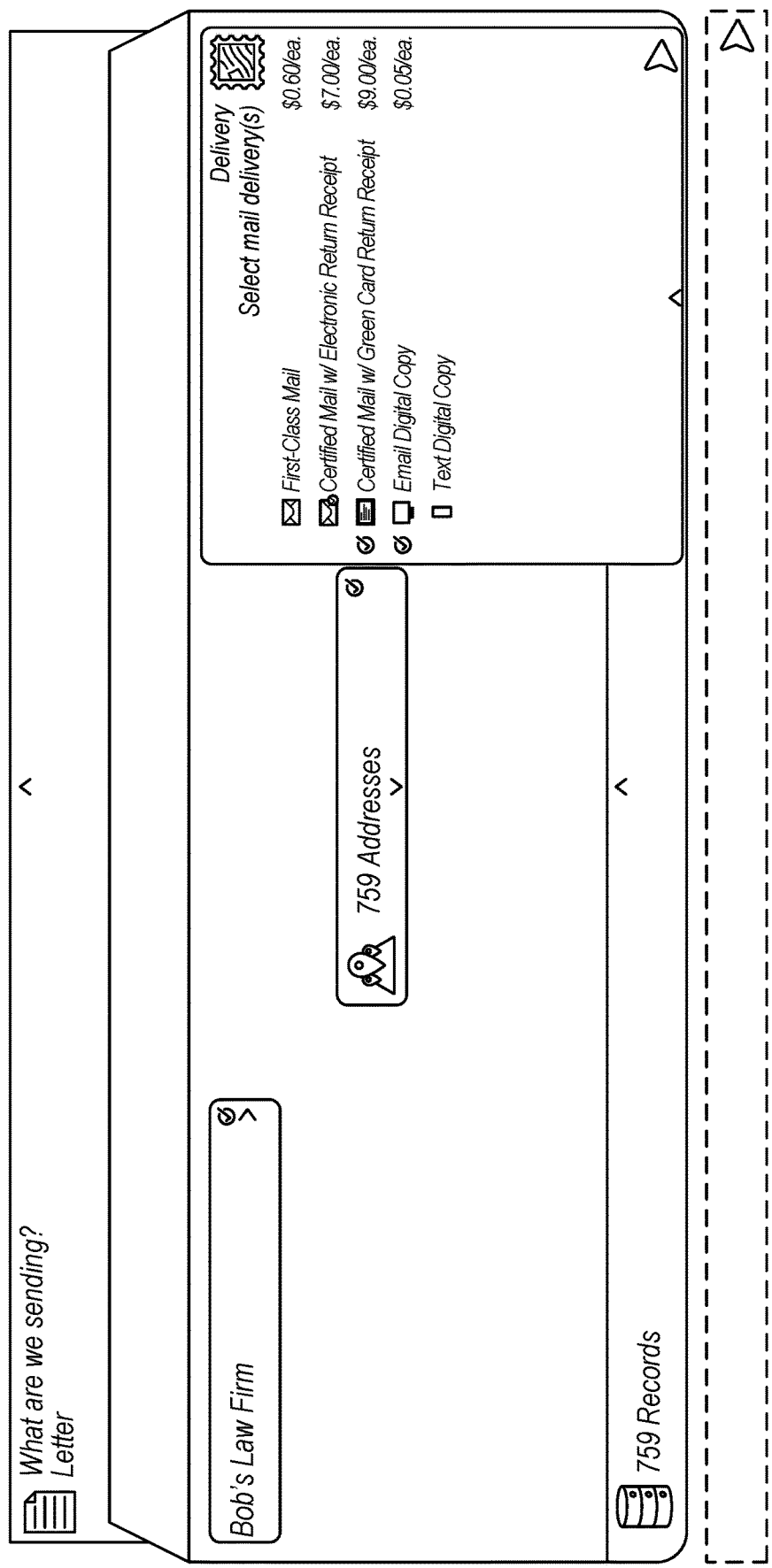
FIG. 9 is an example GUI displaying a plurality of selectable delivery methods for the postage items, according to some embodiments.
Figure 10:
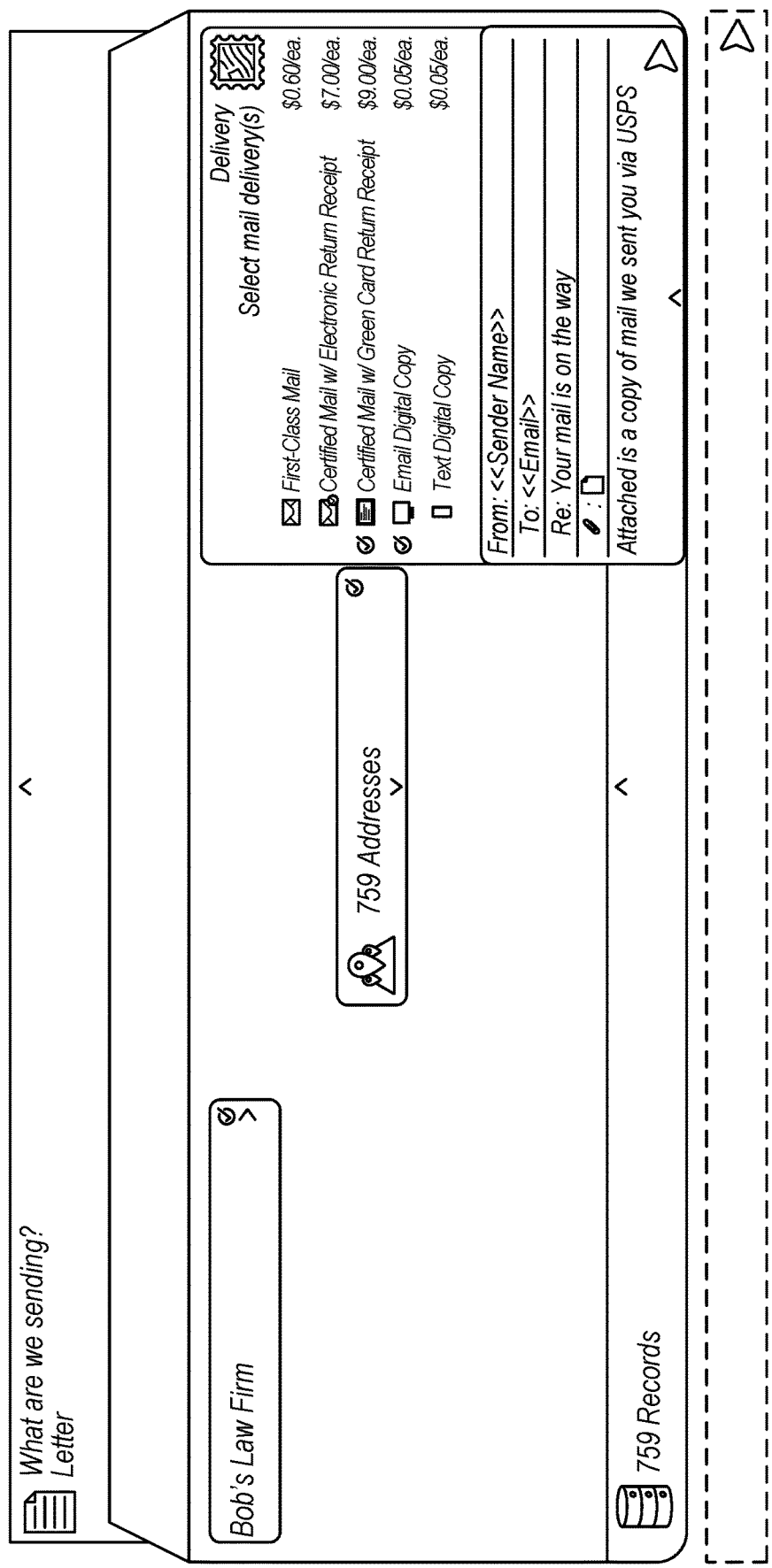
FIG. 10 is an example GUI displaying a prompt to draft an email or short messaging service (SMS) message for sending with a digital copy of the postage item, according to some embodiments.

In some embodiments, the GUI may present one or more additional icons to allow a client to customize and/or upload additional aspects of the postage items, as shown in FIG. 5. For example, an icon may be presented that is selectable to display a prompt, wherein the prompt is selectable to input a sender name for the plurality of postage items. Alternatively or additionally, an icon may be presented that is selectable to display a prompt, wherein the prompt is selectable to input a date for sending the plurality of postage items. Alternatively or additionally, an icon may be presented that is selectable to display a prompt, wherein the prompt is selectable to select a method for delivering the plurality of postage items, as shown in FIG. 9. The one or more selectable methods for delivering the plurality of postage items may include one or more of first-class mail, certified mail with an electronic return receipt, certified mail with a green card return receipt, emailed digital copy, and/or text digital copy, among other possibilities. In some embodiments, an automatic or manual protocol for the handling of undelivered and returned mail may also be selected. In some embodiments, as illustrated in FIG. 10, when the client selects to email a digital copy of the postage items as one of the delivery methods, the GUI may present a prompt to draft the email to be sent along with the digital copy of the postage item.

In some embodiments, the GUI may present an icon that is selectable to allow a client to upload a letter template and customize portions of the letter template for different recipients. For example, as illustrated in FIG. 5, the GUI may include an icon that is selectable to prompt the client to upload a letter template for the plurality of postage items. The computer system may upload the letter template responsive to further user input. After successfully uploading the letter template, the GUI may automatically display the letter template and the addressee data file as shown in FIG. 11. In these embodiments, the computer system may be configured to receive user input to select a portion of the text in the displayed letter template and associate the selected text with a particular column of the addressee data file. The client may associate the selected portion of text and the particular column of the addressee data file by dragging and dropping the selected text onto the column, dragging and dropping the column onto the selected text, or by performing another type of user input, in various embodiments. The computer system may prepare the printing instructions to, for each of the plurality of postage items, replace the selected portion of text with respective entries in the particular column. As one example, as illustrated in FIG. 11, a client may select a portion of text by highlighting the addressee name (e.g., "Sherry Miller") in the template letter, and the client may drag and drop this name onto a "Name" column of the addressee data file. The computer system may then prepare printing instructions in which, for each postage item, the selected text in the template letter is replaced with a different respective name from the "Name" column of the addressee data file, for each of the plurality of postage items. More generally, the client may select any portion of text from the template letter and associate it with any column of the addressee data file, to auto-populate the selected portion of text with respective entries in the associated column of the addressee data file for each of the plurality of postage items.

At 210, an indication of the association of the plurality of columns with the respective address field types is displayed on the GUI. In some embodiments, the indication may show a single example (e.g., from a single row and/or for a single addressee) of how the entries from the addressee data file are mapped onto address field types. The GUI may be configured to receive input to scroll through a display of this mapping for different addressees, allowing the user to ascertain whether the mapping was performed correctly for multiple addressees.

In some embodiments, the GUI may be configured to receive user input to change and/or correct the association of columns and address field types. For example, a user may identify a mistake in the mapping of a first column to an address field type (e.g., if a column was mapped to an incorrect address field type), and may provide input to correct the mapping. In some embodiments, the GUI may enable a user to drag and drop a different address field type onto the first column of the addressee data file, drag and drop the first column of the addressee data file onto a different address field type, or perform another type of user input to change the association of the first column with the address field types. For example, the second user input may associate the "Name" address field type with a column of the addressee data file that contains the first name (or full name) of each recipient. As shown in FIG. 7, the header fields of the displayed addressee data file may be updated to display the address field type associated with the respective column.

Advantageously, the second user input provides an efficient mechanism for associating fields in an addressee data file of unspecified format to the specific address field format utilized by a particular mailing service (e.g., USPS). For example, USPS mailings utilize a particular arrangement of specific address field types of a recipient's address (e.g., name, address, city, state, zip code, etc.). Different addressee data files (e.g., from different clients, or different data files from the same client) may be formatted differently such that these specific address field types are arranged in different columns and/or different orders within those columns. The addressee data file may also contain additional information in additional columns besides the address field types utilized by the mailing service for addressing an envelope. Accordingly, an undirected attempt to print envelope labels according to entries in different columns of the addressee data file may likely result in incorrectly printed addresses that may not be deliverable. The interactive GUI described herein provides an intuitive method for a client to quickly and easily associate specific columns of an addressee data file with the address field types of the mailing service in an integrated and streamlined graphical user interface. Displaying both the address field types of the mailing service and the portion of the addressee data file simultaneously on the same GUI enables a client to provide only a single user input (e.g., a drag and drop input) to associate a specific address field type with a particular column, so that printing instructions may be produced with the relevant address fields in the appropriate locations on the envelope.

In some embodiments, when a user provides input to change the mapping, the machine learning algorithm may become modified based on the change in the association of the first column of the plurality of columns to the first address field type. For example, parameters of the machine learning algorithm may be modified to improve the likelihood of successfully classifying a similar data file in a future iteration.

At 212, at least in part in response to receiving further user input, instructions are prepared for printing entries from the first column of the addressee data file on respective postage items of the plurality of postage items as a first address field.

Figure 12:
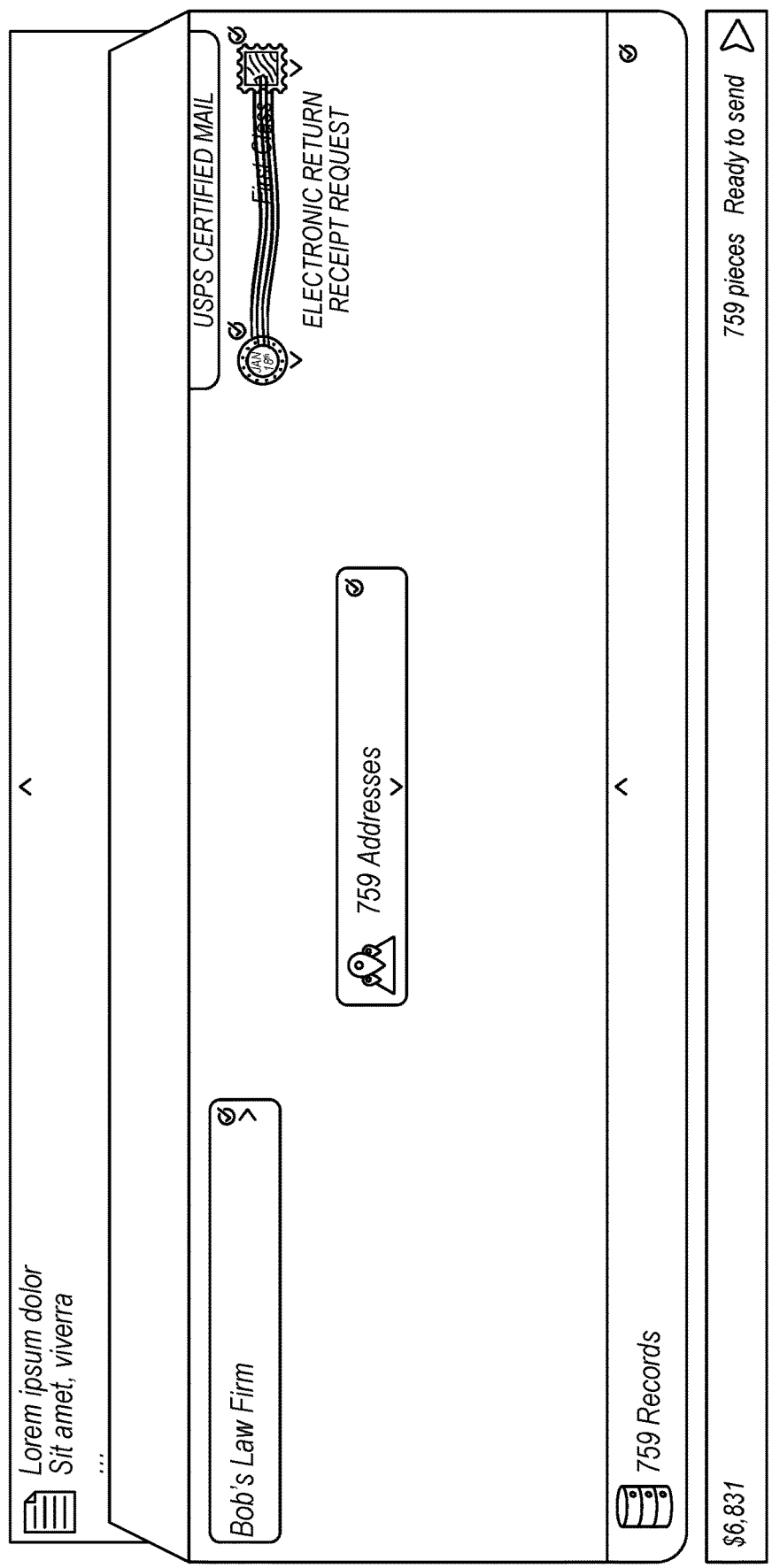
FIG. 12 is an example GUI displaying a representation of completed instructions for printing a plurality of postage items, according to some embodiments.

In some embodiments, as the client sequentially uploads and/or customizes different elements of the postage items through the GUI, the GUI may update the displayed postage item to reflect the current state of the Send. For example, as shown in FIG. 12, a finalized Send may display the Sender name (e.g., "Bob's Law Firm"), the number of entered addresses (e.g., "759 Addresses"), part of the content of the postage item (e.g., "Lorem ipsum dolor", etc.), the type of delivery method (e.g., "USPS Certified Mail" with Electronic Return Receipt Request"). Additionally or alternatively, the GUI may display other information related to the Send, such as the total number of postage items to be sent (e.g., "759 pieces"), the total cost of the mailings (e.g., "$6,831"), and/or an indication that the printing instructions are ready to send to a printing service (e.g., "Ready to Send").

At 214, the instructions are stored in a non-transitory computer-readable memory medium. In some embodiments, the computer system transmits the instructions to a printer to print the plurality of postage items.

In some embodiments, the GUI may be configured to facilitate dynamic tracking of the delivery status of the plurality of postage items, once the postage items have been printed and shipped. For example, the computing device may be configured to receive user input for the GUI to display the delivery status of the plurality of postage items. The computing device may automatically track the delivery status of the plurality of postage items, and display this information on the GUI responsive to user input.

In some embodiments, responsive to a first postage item of the plurality of postage items having an unsuccessful or returned delivery status, the method may provide instructions to resend or redirect the first postage item. Providing instructions to resend or redirect the first postage item may be performed in response to user input into the GUI, or it may be performed automatically in response to the first postage item having the unsuccessful or returned delivery status.

Figure 16A:
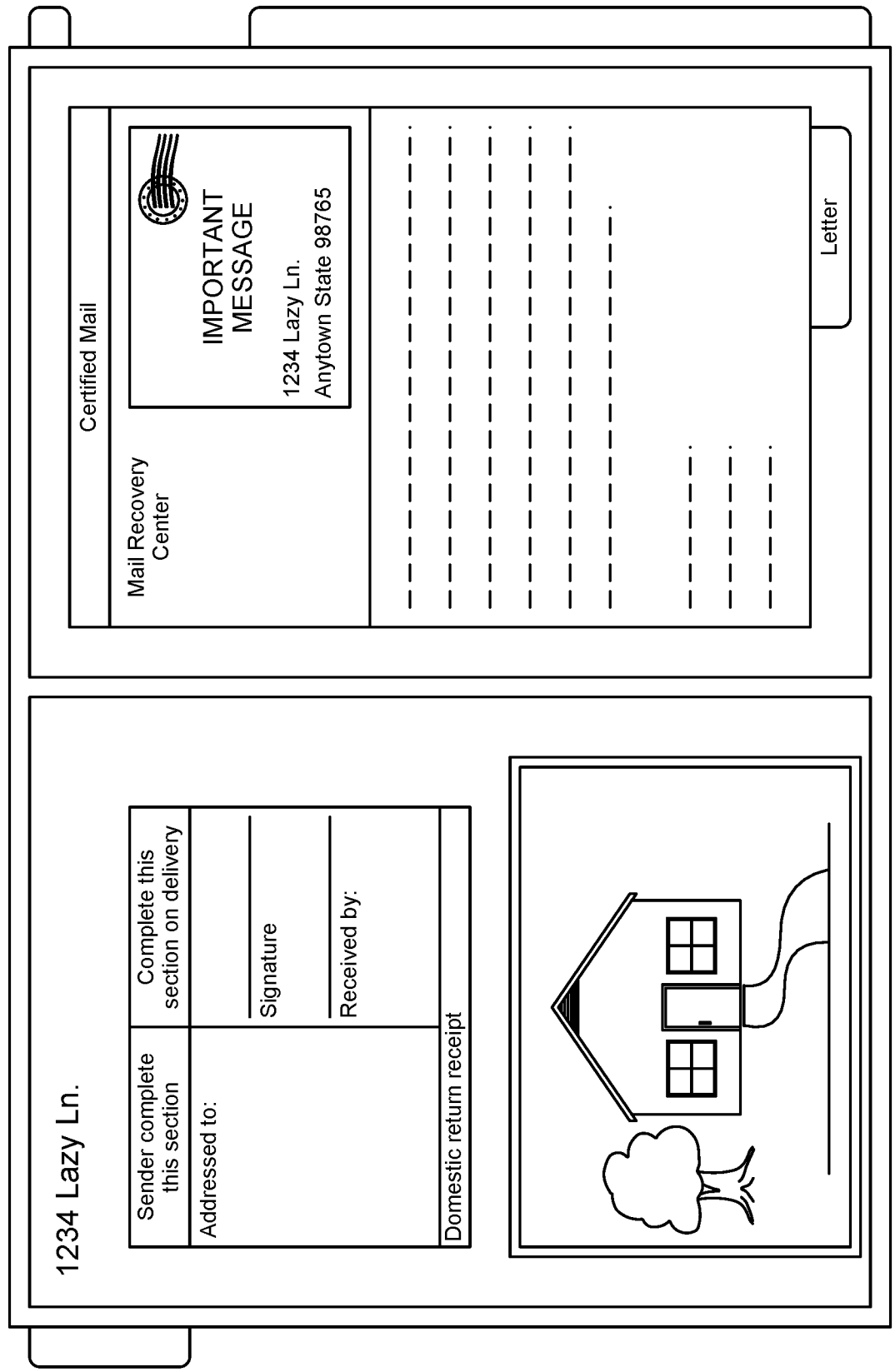
FIG. 16A is an example GUI displaying details related to an unsuccessfully delivered postage item, according to some embodiments.
Figure 16B:
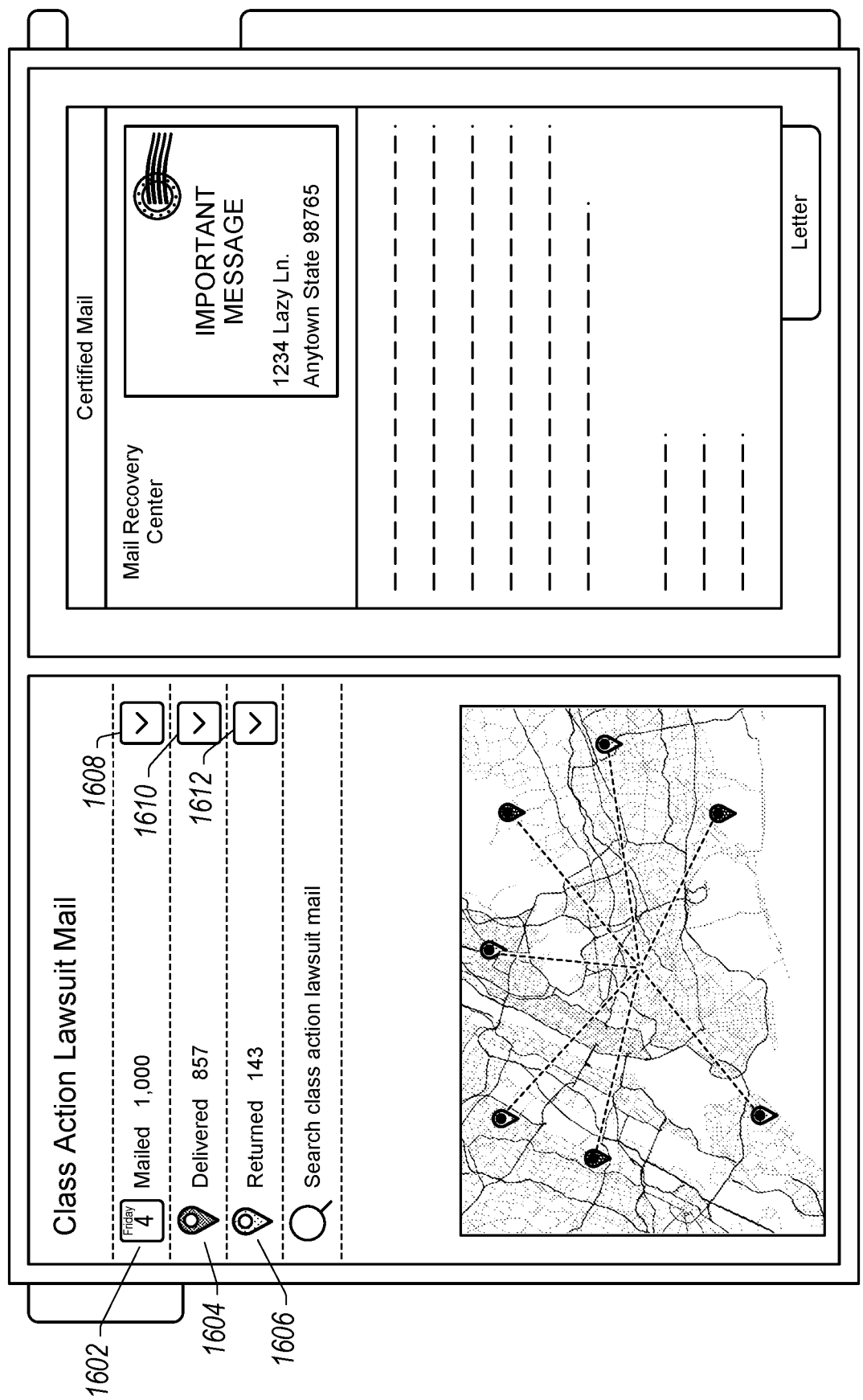
FIG. 16B is an example GUI displaying detailed tracking results for a plurality of mailed postage items, according to some embodiments.

For example, as shown in FIG. 16B, the GUI may present detailed tracking information that shows the number of postage items that were mailed and the date that they were mailed 1602, the number of postage items that were successfully delivered 1604, and the number of postage items that were returned 1606. For each of these categories, a dropdown menu may be presented 1608-1612 that is selectable to display further detail related to the respective category. For example, the "Delivered" dropdown menu 1610 may be selected to display a list of addressees for whom the postage item was successfully delivered. The "Returned" dropdown menu 1612 may similarly display a list of addressees for whom the postage item was returned. Additionally or alternatively, the "Returned" dropdown menu 1612 (or another icon) may be selectable to present an option that the user may select to resend or redirect the postage items for these addressees.

FIGS. 13-16, described in greater detail below, present additional details related to facilitation of tracking with the GUI.

Additional Description

The following paragraphs provide additional description of methods and systems for preparing printing instructions for a plurality of postage items, according to various embodiments.

In some embodiments, a "Create Send" action may be initiated by a user, whereby a client creates a campaign for printing a plurality of postage items, called a "Send." The system (e.g., the computer system 104) automatically creates an empty container to store more information about the Send. The client uploads an addressee list (e.g., an addressee data file), which may be a data file such as a .cvs or .xls file, among other possibilities. In some embodiments, other client systems such as Microsoft Office™ plugins may be integrated into the upload process. The system may intelligently parse the addressee list and auto-select a header row for the addressee list.

The client may present user input to assign address fields from the data file columns to different address field types. The system may automatically create a map between column headers and address fields of the postage items. The mapping between columns of the addressee data file and address field types may be leveraged anytime the addressee data file is utilized to prepare the printing instructions.

The client may upload a content template or select an existing template to generate letters. Templates may be of various files formats such as .pdf, word documents, or .html, and may include personalization. The content template may be a letter template, a flyer, an advertisement template, or any of a variety of other types of content that may be mailed with the postage items. The system saves the template to be used anytime for the Send.

The client may match fields from the addressee data file to the content template and create a template map. The system may save this mapping anytime the content template is used in the Send.

The client may specify one or more service(s) and a date for the Send. The client may select USPS First-Class and Certified services, USPS priority services, and/or major courier services such as FedEx™ and UPS™, giving clients a number of options to choose from. The system may create a request for a mail house with service type and date as parameters.

The system may automatically trigger a merge process using the addressee data file and the content template. Addresses entered (e.g., uploaded) by the client may be automatically standardized using a USPS application programming interface (API) to provide accurate delivery. Standard services such as Coding Accuracy Support System (CASS), Notice of Change of Address (NCOA), and delivery point verification may be provided.

The system may automatically create printing instructions specifying a job for a printing service with the letters, service type, date and other parameters specified. The printing service operator may select the job to queue it for printing. A mailhouse API may automatically print the letters and envelopes along with generating and printing barcodes that will be used to track the postage item lifecycle.

The letters from the printer may be automatically inserted into an inserter which folds the letters, inserts them into envelopes, glues the green card (if utilized), and captures an image of the final envelope for tracking and verification. The envelopes may be dropped into trays, which are dropped off at the relevant mailing service (e.g, USPS).

The system may be further configured to provide automated scanning and tracking services for the plurality of postage items. The computer system may scan the printed postage items (or cause them to be scanned, e.g., by the printer), and the scans may be uploaded back to the Send for the clients to view. The journey of the postage items may be automatically tracked as they are scanned at each mailing facility. These scanned events may be transcribed to statuses and transmitted back to the Send as "In-Transit", "Delivered", "Returned", "First-Class: USPS IV-MTR Certified: Article number", etc.

Returned postage items may be scanned, and the scanned postage items may be sent back to the Send along with a status update of "Returned." If the USPS doesn't know the status of certified mail, the status may be marked as "Unknown" and postage for such letters may be refundable.

In some embodiments, the GUI may allow a client to browse their deliverability metrics as desired and take further action(s) such as rerunning a Send with a different delivery service, receiving a refund for undeliverable certified mail, identifying corrected address(es) and rerunning the campaign, and/or clean up address or other data based on returns and/or delivery. The letter lifecycle may be automatically tracked for all Sends, enabling the client to efficiently monitor delivery success and failure (e.g., through proof of delivery, confirmation signatures, green cards, etc.) for each of the plurality of postage items.

Figure 13:
FIG. 13 is an example GUI displaying a tracking map for outgoing postage items, according to some embodiments.

FIG. 13 is an example GUI displaying a tracking map for outgoing postage items, according to some embodiments. In some embodiments, an icon on the GUI (e.g., a clickable icon labelled "Tracking") may be selectable to display a tracking map such as the one shown in FIG. 13. As illustrated, the tracking map displays the status for a plurality of postage items being shipped to respective destinations from a single location. The shading on the destination flags indicates that the postage items have been mailed to the respective destinations, as indicated in the legend. Further, arrows on the dashed lines indicate that the mail is currently outgoing.

FIG. 14 is an example GUI displaying a tracking map for delivered postage items awaiting confirmation, according to some embodiments. The shading of the destination flags indicates that the postage items have been delivered and are awaiting confirmation. Further, the incoming arrows indicate that confirmation receipts are incoming to the point of mailing for the postage items.

Figure 15:
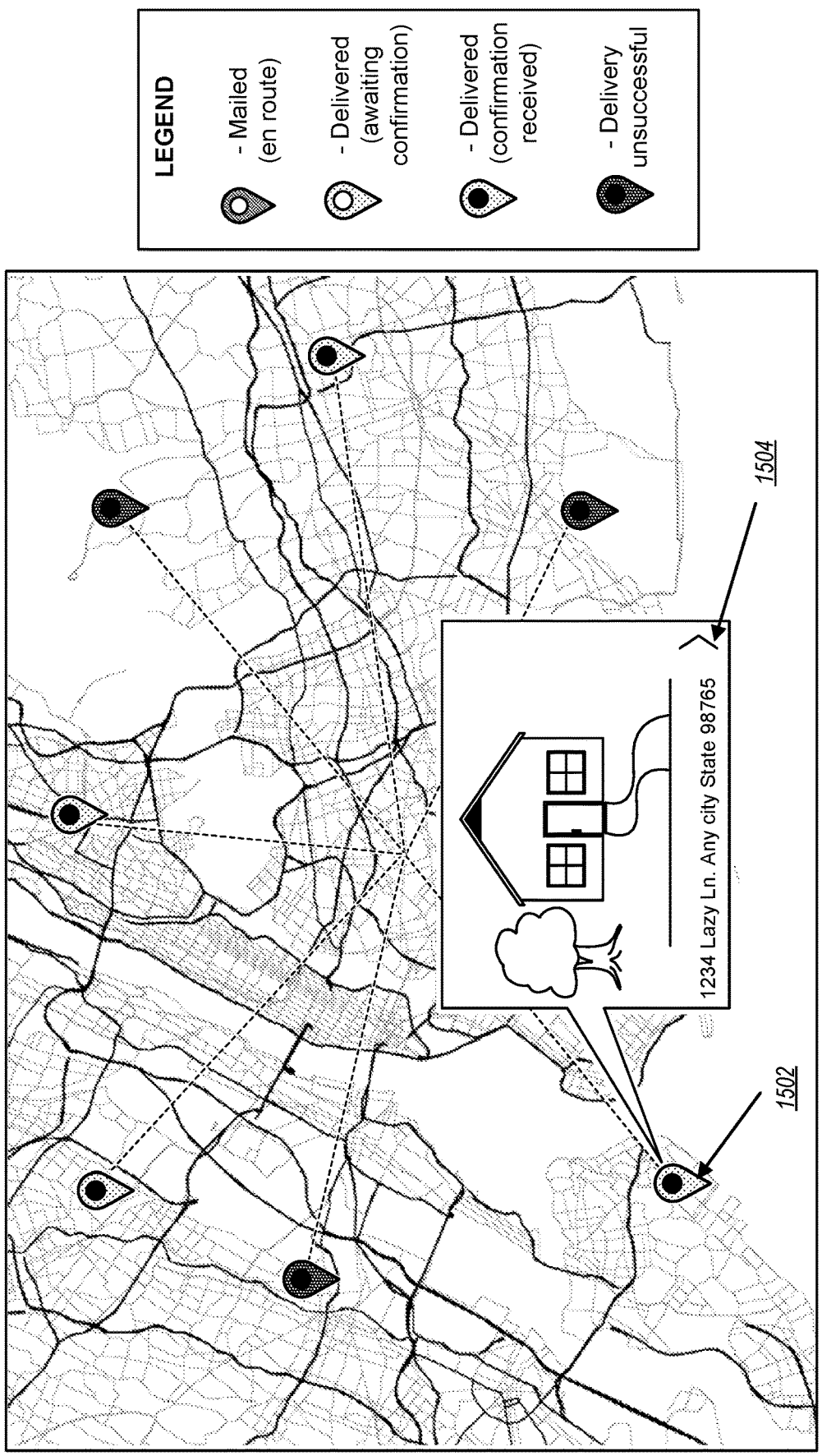
FIG. 15 is an example GUI displaying a tracking map showing successfully and unsuccessfully delivered postage items, according to some embodiments.

FIG. 15 is an example GUI displaying a tracking map showing successfully and unsuccessfully delivered postage items, according to some embodiments. As illustrated, a first subset of the postage items have been delivered and confirmation receipts have been received, while a second subset of the postage items have been unsuccessfully delivered. In some embodiments, a user may select one of the destinations to illustrate further details regarding the destination. For example, as illustrated in FIG. 15, a destination icon 1502 for one of the destinations with successful delivery and confirmation may be selected to display an image and address for the destination.

In some embodiments, the destination icon 1502 may be further selected (e.g., with a double click), or additionally or alternatively an icon 1504 that is displayed in the window that presents the address details is selected, to display more detailed information related to the destination, as shown in FIG. 16A. As illustrated in FIG. 16A, the more detailed information may include an image of the signed confirmation receipt, a copy of the postage item, and an image of the destination, among other possibilities. When the postage item was unsuccessfully delivered to or returned from the destination, the more detailed information may display an icon that is selectable to resend or redirect the postage item.

In some embodiments, an icon may be presented on the GUI that is selectable to display detailed information related to tracking of the plurality of postage items, as shown in FIG. 16B. As illustrated, the detailed information may display a map of the delivery status of the plurality of postage items, numerical descriptions of how many postage items have been mailed, delivered, and returned, and a representation of the postage item, in some embodiments.

In some embodiments, clients may be able to search for the status of particular postage items by unique identifiers such as recipient name and/or address. A search result may include a letter link that shows original letter and all scans (e.g., delivery status updates) associated with the letter status.

In some embodiments, a client may digitally store all the postage items associated with a Send and may on a link to recipient as well. The Send may store all the postage items in digital format, and each postage item may have a unique link which can be exposed to a user or the end customer. Advantageously, end customers may reduce the quantity of utilized physical storage and avoid getting letters lost. The postage items may contain letters that are important in law suits and serve as evidence. By digitizing these letters, users may improve compliance and document keeping.

In some embodiments, clients may trigger future mail based on statuses and create a workflow based on rules. As one example, if a first-class mail is undelivered or returned, the client may configure the system to automatically attempt resending the mail via a certified mailing service. The system may store the letters and statuses and display them to a client via a GUI.

Figure 17:
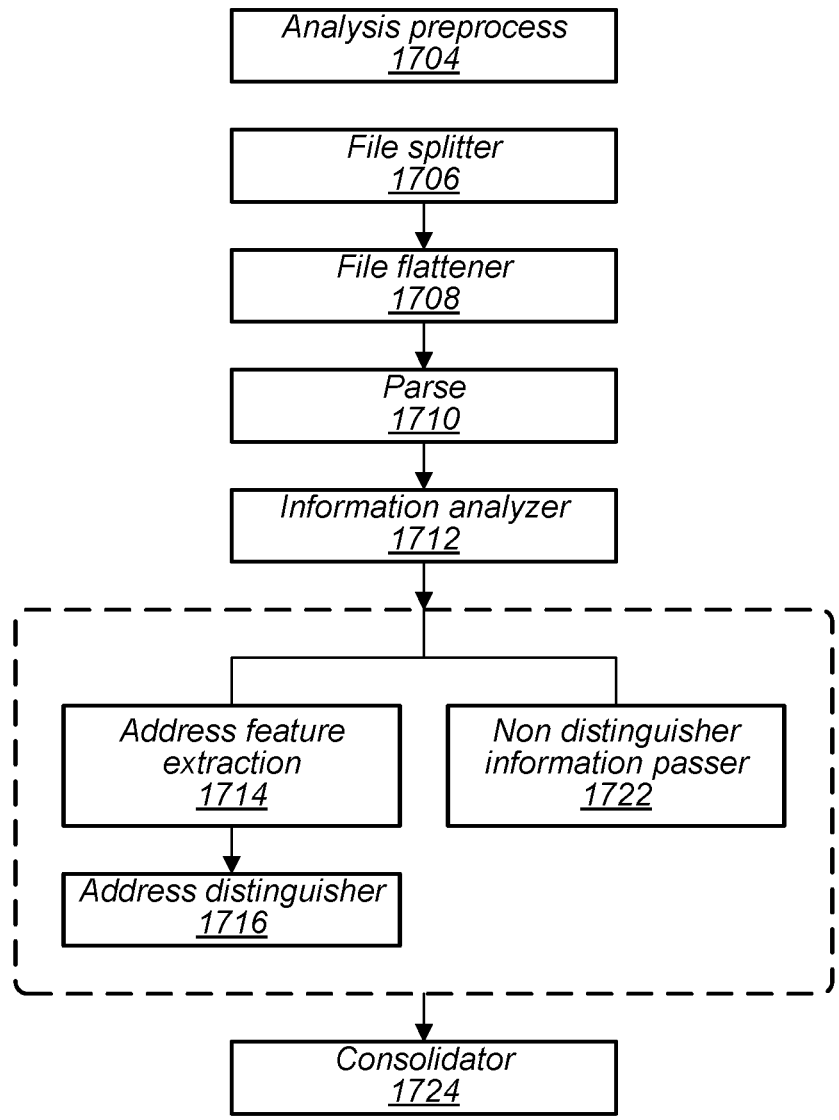
FIG. 17 is a flowchart illustrating a method for performing feature extraction and analysis on uploaded addressee data files for property sale postage items, according to some embodiments.
Figure 18:
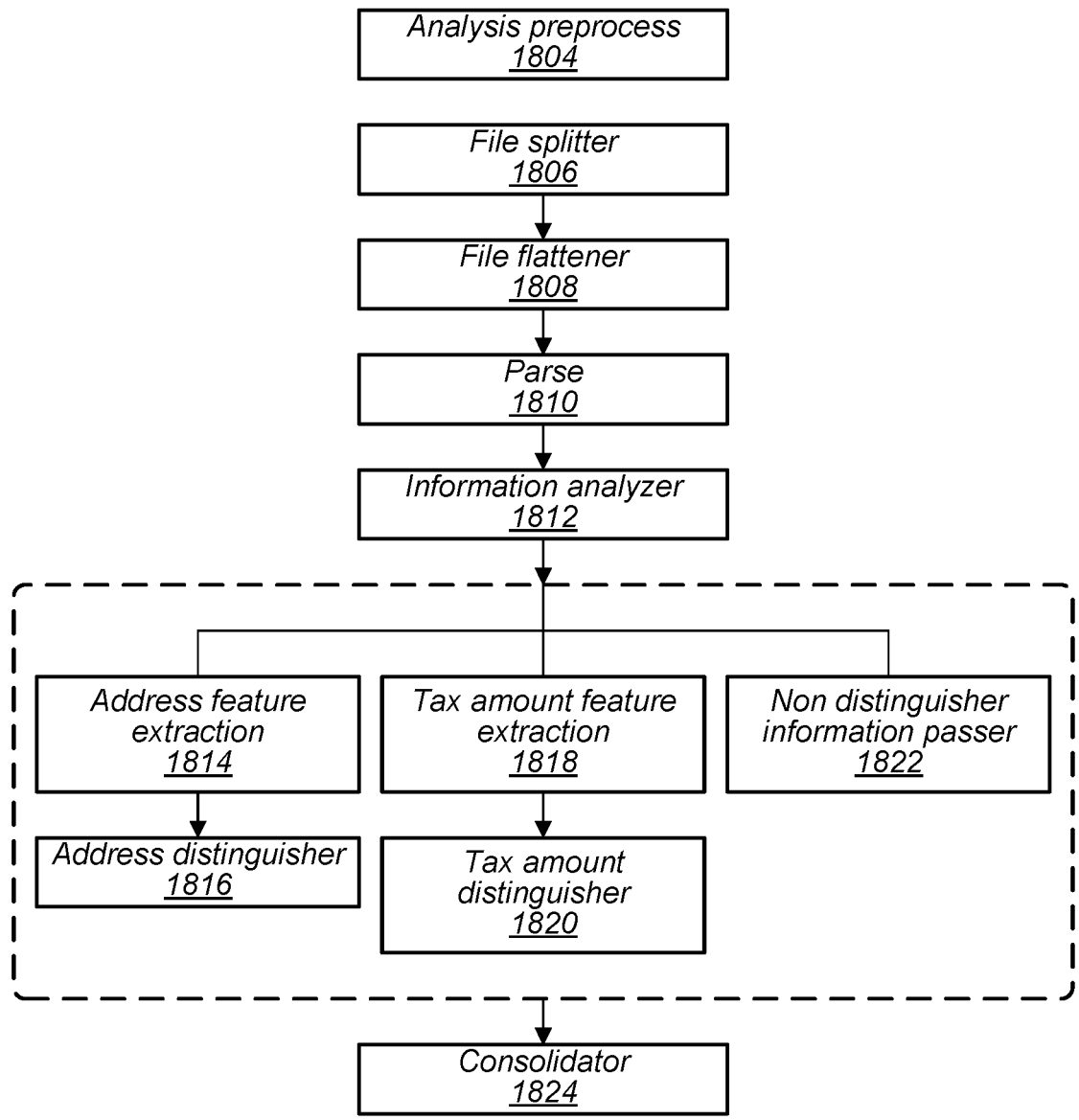
FIG. 18 is a flowchart illustrating a method for performing feature extraction and analysis on uploaded addressee data files for tax sale postage items, according to some embodiments.

FIGS. 17-18—Addressee Data File Feature Extraction and Analysis

FIGS. 17 and 18 are flowcharts illustrating methods for performing feature extraction and analysis on uploaded addressee data files for property sale and tax sale use cases, respectively. As shown, the flowcharts are similar in many respects, and differ primarily in the addition of steps related to tax amount feature extraction and distinguisher for the case of tax sales. Except where explicitly stated to be applicable to exclusively one or the other use case, the following description applies equally to either property sale or tax sale applications, as well as other types of mass mailings, in various embodiments. The method steps shown in FIGS. 17 and 18 may be implemented automatically in response to uploading of an addressee data file to a GUI, in some embodiments.

In some embodiments, a system may be implemented that extracts property sale information or tax sale information from an uploaded addressee data file. The extracted information may include address information for the addressee (i.e., the owner of the property for sale and/or other interested parties), address information related to the property that is for sale, identifiers of the property, and/or other types of information. For a tax sale, the information may further include tax information such as tax year, tax balance, etc. This extraction process may be triggered whenever a property sale type file is uploaded into the system. The system may be configured to receive raw tax files in .csv, .txt, .xml, .xls, .pdf, .doc, .docx, or .xlxs formats, among other possibilities.

At 1704/1804, an analysis preprocess procedure may be implemented. This layer acts as a bridge between the upload event trigger and the system's supported input. For example, the analysis preprocess may handle a transformation of the S3 upload event trigger input into the input/output schema supported by the system.

At 1706/1806, a file splitter procedure is performed to truncate the number of data rows that will be analyzed. Data rows may be extracted from the addressee data file only up to a certain threshold. For example, given a 1 GB .csv file with millions of records, the system may be configured to extract only up to 10,000 records from the data file. This may allow the system to speed up the file analysis process for large files, and may implement a trade-off between speed and prediction accuracy. For example, including more rows (i.e., raising the threshold may result in better accuracy of the data extraction and mapping at the cost of a slower analysis.

In some embodiments, data streaming may be utilized for data extraction, where the system streams through up to the first N data records and saves the data (e.g., 3,000 records or another number). By streaming the data, the function may avoid reading through the whole file before presenting results.

At 1708/1808 a file flattener procedure is implemented to detect and flatten out files with unstructured data, to file titles or headers, and to transform the data into a format that is appropriate for subsequent processing steps. A machine learning algorithm may detect the record pattern of the primary record data and append the supplementary record data into a single row. In some embodiments, it is assumed that the row data that doesn't follow the same record pattern as the primary record are supplementary data for the primary record. File flattening may be applicable to file formats that have unstructured data such as .csv, .txt and .xlxs, among other possibilities. As used herein, unstructured data refers to a tax file or other data file which has row values that don't correspond to the record column.

The file flattener procedure may iterate through each row, with each row compared to the rows below it. A similarity score may be extracted when two rows are compared to each other. Similarity score features may include a number of similar column data types (ex. amount, date, text, etc.) and/or a number of non-blank columns, among other possibilities. In some embodiments, matching rows are determined based on the similarity score. The first matching row pattern that fits a main data pattern may be selected as the pattern to flatten the file. Rows below the main data row may be assumed to be related to the main data and may be appended into the main data row. Rows above the main data row may be assumed to be the headers of the main data, and may be removed from the restructured (i.e., flattened) data file.

At 1710/1810, a parser procedure may be implemented to transform the structured data from any supported file types into a consistent data schema for use by the system. The parser may Interface with the input data expected by the next layers of the pipeline. This layer may allow the system to be able to process any supported file types. The structured data may be transformed from any supported file types into a consistent json data schema that is compatible with the system.

At 1712/1812, an information analyzer procedure may be performed. The information analyzer may analyze the row values of each column using a trained Machine Learning (ML) model. Given a value, the ML model may determine a particular column is relevant tax file information and if so, what type of information it is, for example, address, legal description, etc. An ML library may dynamically identify data points given specific characteristics of the data. The library may build an internal decision tree based on past experience and re-train itself as additional data (e.g., user feedback) is received by the system. The information analyzer may output labels of the model, including but not limited to Address, Amount, Assessment Number, City, Legal Description, Irrelevant Information, Owner Name, Parcel Number, Postal Code, State, Tax Account Number, and/or Year.

At 1714/1814, address feature extraction is performed. Feature extraction extracts features to be fed to the ML model to distinguish the columns with distinguishable address information.

At 1716/1816, an address distinguisher procedure is performed to assign headers for each column based on the predicted information type for majority of the rows and filter out only the columns with distinguishable address headers. The columns with address information are distinguished as property addresses vs. owner addresses based on the features given by the previous step. A boosted decision tree model may be implemented to analyze extracted features to distinguish the addresses.

Examples of column features may include mappedHeader, which analyzes a header for the column based on the previous step, a confidence score that quantifies the likelihood of a correct classification for the column, a "containsPO" feature to indicate whether any of the rows within the column contain a value of "PO" to indicate a potential PO Box address type, or a "containsMultipleUniqueValues" feature to indicate whether the rows of the column contain multiple unique values, among other possibilities.

At 1818, a tax amount feature extraction procedure is performed for tax sale embodiments. The desired features are extracted to be fed to the ML model to distinguish the columns with tax amount information. The extracted features may include mappedHeader, an isGreaterThanOrEqualTo feature that compares the average tax amount of the current column to the ones on the left and right.

At 1820, a tax amount distinguisher procedure is implemented. to assign headers for each column based on the predicted information type for a majority of the rows, and to filter out only the columns with tax amount headers. The tax amounts may be distinguished into separate categories which may include one or more of Balance, Interest, Penalty, Costs and Total, among other possibilities. The columns with tax amount information may be distinguished based on the features extracted by the previous step. A boosted decision tree model may be used to analyze the values of the columns, as well as columns to the left and right of each column.

At 1722/1822, non-distinguishable information may be passed. This layer assigns headers for each column based on the predicted information type for majority of the rows and filters out only the non-distinguishable headers. Effectively, this step simply passes columns with non-distinguishable headers directly into the next step (1724/1824) for further processing.

At 1724/1824, a consolidator procedure may be implemented to consolidate all the predicted columns into a single data schema. The consolidator procedure may combine the Address Distinguished Data, Tax Amount Distinguished Data (Applicable for tax sale embodiments), and non-distinguishable Data into a single file. This layer may also handle updating the file mapping of the user on the frontend, which the user may confirm.

Data Annotation

In some embodiments, .pdf data may be read and modified into a compatible format (e.g., a spreadsheet file). Letter data delimiter may be identified and annotated for pipeline processing. The data may be split and merged based on business rules, or custom split rules. Letter annotations may be identified to split single-file letters to multiple recipient letters. Splitting logic may be automatically detected based on the number of pages or on unique patterns. Custom delimiter may be applied to programmatically define splitting and merging of letter files. Data integration may be performed with CSV (e.g., XLS-to-CSV), to insert custom external data onto source letter data, and pull data from CSV or XLS to a custom build letter. PDFs and Word files may be regenerated based on programmatic data, and PDF and Word data may be extracted and stored onto a platform database.

It is well understood that the use of personally identifiable information should follow privacy policies and practices that are generally recognized as meeting or exceeding industry or governmental policies for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets).

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for printing a plurality of postage items, the method comprising: displaying a graphical user interface (GUI) on a display, wherein the GUI is configured to receive first user input and second user input; responsive to the first user input, by a processor coupled to a non-transitory computer-readable memory medium: uploading an addressee data file, wherein the addressee data file comprises a plurality of entries in a plurality of rows and a plurality of columns, wherein the entries comprise strings of text; determining a feature for one or more columns of the addressee data file, wherein the feature comprises a quantitative characteristic of a string of text shared by a predetermined number of entries in the one or more columns; associating the one or more columns of the addressee data file with an address field type based at least in part on the feature; and displaying, on the GUI, an indication of the association of the one or more columns with the address field type; responsive to the second user input, automatically preparing, by the processor, instructions for printing entries from the one or more columns of the addressee data file on respective postage items of the plurality of postage items as a destination address of the address field type, said preparing comprising: identifying a plurality of the addressees in respective rows of the addressee data file, wherein each of the plurality of the addressees has a same first address within a first column, and within a second column the plurality of addressees have non-identical addresses with respect to others of the plurality of addressees; selecting, for each addressee of the plurality of addressees, the respective second address, located in the second column, as a respective destination address; including the selected destination addresses as entries in the instructions for printing the entries; and transmitting, from the processor over a transmission path to a printing processor of a printing device, the instructions for printing the entries onto respective ones of the postage items; printing, by a printing device responsive to receipt of the instructions, respective ones of the selected destination addresses onto respective ones of the postage items.

2. The method of claim 1, further comprising: extracting rows from the addressee data file up to a user-selectable threshold number of rows, wherein said determining feature from the one or more columns is performed only for the extracted rows.

3. The method of claim 1, further comprising: prior to determining the feature from the one or more columns, performing a file flattening procedure to restructure the addressee data file, wherein each row of the restructured addressee data file comprises all entries associated with a single respective addressee.

4. The method of The method of wherein associating the one or more columns of the addressee data file with the address field type based at least in part on the feature comprises implementing a machine learning algorithm to identify the address field type based on the feature.

5. The method of claim 4, further comprising: receiving second user input to change the association of the one or more columns to a second address field type; and modifying the machine learning algorithm based on the change in the association of the one or more columns to the second address field type.

6. The method of claim 1, wherein the feature comprises a determination of whether entries in the one or more columns comprise one or more of: a string comprising numbers; a string of entirely numbers; a string comprising non-numerical elements; a string comprising special characters; a string comprising "city;" and a string comprising a number within 1900 and a current year.

7. The method of claim 1, wherein the feature comprises, for entries in the one or more columns, one or more of: a number of words; a number of letter characters; a number of numerical characters; a number of numbers; a numerical value; a number of special characters; a number of digits of a last number of the entries; a number of characters of a last word of the entries; and a number of decimal digits of the entries.

8. The method of claim 1, wherein the GUI further comprises a first icon, wherein the method further comprises: responsive to third user input selecting the first icon: displaying a prompt that is selectable to input a sender name for the plurality of postage items; displaying a prompt that is selectable to input a date for sending the plurality of postage items; or displaying a prompt to select a method for delivering the plurality of postage items.

9. The method of claim 8, wherein the prompt displays one or more selectable methods for delivering the plurality of postage items, wherein the one or more selectable methods include one or more of: first-class mail; certified mail with an electronic return receipt; certified mail with a green card return receipt; emailed digital copy; and text digital copy.

10. The method of claim 1, wherein different rows of at least a subset of the plurality of rows correspond to different addressees, and wherein different columns of at least a subset of the plurality of columns correspond to different address field types.

11. A non-transitory computer-readable memory medium comprising program instructions which, when executed by a processor, cause a computer system to: display a graphical user interface (GUI) on a display, wherein the GUI is configured to receive first user input and second user input; responsive to the first user input, by the processor: upload an addressee data file, wherein the addressee data file comprises a plurality of entries in a plurality of rows and a plurality of columns, wherein the entries comprise strings of text; determine a feature from one or more columns of the addressee data file, wherein the feature comprises a quantitative characteristic of a string of text shared by a predetermined number of entries in the one or more columns; associate one or more columns of the addressee data file with an address field type based at least in part on the feature; and display, on the GUI, an indication of the association of the one or more columns with the address field type; responsive to the second user input, prepare, by the processor, instructions for printing entries from the one or more columns of the addressee data file on respective postage items of a plurality of postage items as a destination address of the address field type, said preparation comprising: identification of a plurality of the addressees in respective rows of the addressee data file, wherein each of the plurality of the addressees has a same first address within a first column, and within a second column the plurality of addressees have non-identical addresses with respect to others of the plurality of addressees; selection, for each addressee of the plurality of addressees, of the respective second address, located in the second column, as a respective destination address; and inclusion of the respective destination addresses in the instructions for printing entries; and transmit, from the processor over a transmission path to a printing processor of a printing device, the instructions for printing the entries onto respective ones of the postage items; printing, by a printing device responsive to receipt of the instructions, respective ones of the selected destination addresses onto respective ones of the postage items.

12. The non-transitory computer-readable memory medium of claim 11, wherein the program instructions are further executable to: extract rows from the addressee data file up to a user-selectable threshold number of rows, wherein said determining the feature from the one or more columns is performed only for the extracted rows.

13. The non-transitory computer-readable memory medium of claim 11, wherein the program instructions are further executable to: prior to determining feature from the one or more columns, perform a file flattening procedure to restructure the addressee data file, wherein each row of the restructured addressee data file comprises all entries associated with a single respective addressee.

14. The non-transitory computer-readable memory medium of claim 11, wherein associating the one or more columns of the addressee data file with the address field type based at least in part on the feature comprises implementing a machine learning algorithm to identify the address field type based on the feature, and wherein the program instructions are further executable to: receive second user input to change the association of the one or more columns to a second address field type; and modify the machine learning algorithm based on the change in the association of the one or more columns to the second address field type.

15. The non-transitory computer-readable memory medium of claim 11, wherein the feature comprises a determination of whether entries in the one or more columns comprise one or more of: a string comprising numbers; a string of entirely numbers; a string comprising non-numerical elements; a string comprising special characters; a string comprising "city;" a string comprising a number within 1900 and a current year, a number of words; a number of letter characters; a number of numerical characters; a number of numbers; a numerical value; a number of special characters; a number of digits of a last number of the entries; a number of characters of a last word of the entries; and a number of decimal digits of the entries.

16. The non-transitory computer-readable memory medium of claim 11, wherein the GUI further comprises a first icon, wherein the program instructions are further executable to cause the processor to: responsive to third user input selecting the first icon: display a prompt that is selectable to input a sender name for the plurality of postage items; display a prompt that is selectable to input a date for sending the plurality of postage items; or display a prompt to select a method for delivering the plurality of postage items.

17. An apparatus, comprising: a processor configured to execute instructions to: display a graphical user interface (GUI) on a display, wherein the GUI is configured to receive first user input and second user input; responsive to the first user input, by the processor: upload an addressee data file, wherein the addressee data file comprises a plurality of entries in a plurality of rows and a plurality of columns, wherein the entries comprise strings of text; determine a feature from one or more columns of the addressee data file, wherein the feature comprises a quantitative characteristic of a string of text shared by a predetermined number of entries in the one or more columns; associate one or more columns of the addressee data file with an address field type based at least in part on the feature; display, on the GUI, an indication of the association of the one or more columns with the address field type; responsive to the second user input, prepare, by the processor, instructions for printing entries from the one or more columns of the addressee data file on respective postage items of a plurality of postage items as a destination address of the address field type, said preparation comprising: identification of a plurality of the addressees in respective rows of the addressee data file, wherein each of the plurality of the addressees has a same first address within a first column, and within a second column the plurality of addressees have non-identical addresses with respect to others of the plurality of addressees; selection, for each addressee of the plurality of addressees, of the respective second address, located in the second column, as a respective destination address; and inclusion of the respective destination addresses in the instructions for printing entries; and transmit, from the processor over a transmission path to a printing processor of a printing device, the instructions for printing the entries onto respective ones of the postage items; and the printing processor, configured to, responsive to receipt of the instructions for printing the entries onto respective ones of the postage items, execute the received instructions to cause the printing device to print the entries onto respective ones of the postage items.

18. An apparatus of claim 17, wherein execution of the received instructions includes to queue the plurality of postage items for printing by the printing device.

* * * * *

UNITED STATES PATENT AND TRADEMARK OFFICE
CERTIFICATE OF CORRECTION

| | |
|---|---|
| PATENT NO. | : 12,260,366 B2 |
| APPLICATION NO. | : 17/932270 |
| DATED | : March 25, 2025 |
| INVENTOR(S) | : Bryan Barrios, Clark McClendon and Caitlin Wrend |

Page 1 of 1

It is certified that error appears in the above-identified patent and that said Letters Patent is hereby corrected as shown below:

In the Claims

Claim 4, Line 15, Column 20, delete "The method of The method of" and insert -- The method of claim 1, --.

Signed and Sealed this
Twenty-ninth Day of April, 2025

Coke Morgan Stewart
*Acting Director of the United States Patent and Trademark Office*